US012475610B2

(12) United States Patent
Tsuda

(10) Patent No.: US 12,475,610 B2
(45) Date of Patent: Nov. 18, 2025

(54) DISPLAY CONTROL DEVICE FOR A VEHICLE

(71) Applicant: TOYOTA JIDOSHA KABUSHIKI KAISHA, Toyota (JP)

(72) Inventor: Hideki Tsuda, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 153 days.

(21) Appl. No.: 18/382,140

(22) Filed: Oct. 20, 2023

(65) Prior Publication Data
US 2024/0177362 A1 May 30, 2024

(30) Foreign Application Priority Data
Nov. 29, 2022 (JP) ................................. 2022-190590

(51) Int. Cl.
G06T 11/00 (2006.01)
G06V 20/20 (2022.01)
G06V 20/58 (2022.01)

(52) U.S. Cl.
CPC ............. G06T 11/00 (2013.01); G06V 20/20 (2022.01); G06V 20/58 (2022.01)

(58) Field of Classification Search
CPC ........ G06T 11/00; G06V 20/20; G06V 20/58; B60K 35/00
See application file for complete search history.

(56) References Cited

U.S. PATENT DOCUMENTS

| 11,491,915 | B2* | 11/2022 | Takahashi | H04N 5/265 |
| 2014/0267263 | A1* | 9/2014 | Beckwith | G06T 15/08 |
| | | | | 345/424 |
| 2014/0333729 | A1* | 11/2014 | Pflug | G06T 15/50 |
| | | | | 348/47 |
| 2017/0161949 | A1* | 6/2017 | Seder | G02B 27/0179 |
| 2017/0307881 | A1* | 10/2017 | Yoon | G06T 19/006 |

FOREIGN PATENT DOCUMENTS

| CN | 113165510 A | * | 7/2021 | ............. B60K 35/00 |
| JP | 2020-128172 A | | 8/2020 | |

OTHER PUBLICATIONS

CN 113165510A original and translation. (Year: 2021).*
Original and Translation of JP2014182719A (Year: 2014).*

* cited by examiner

Primary Examiner — Frederick M Brushaber
(74) Attorney, Agent, or Firm — Oliff PLC

(57) ABSTRACT

A display control device for a vehicle, includes an image forming section configured to form an AR image having a shape that conforms to a dividing line of a lane in which a vehicle travels, an object recognition section configured to recognize object positioned in the lane, and a processor configured to control the image forming section so as to form the AR image. In a case in which it has been determined, based on a distance between the vehicle and the object, that there is a possibility that the AR image will overlap with the object, the processor reduces a visibility of a specific portion of the AR image, which is a portion that has a possibility of overlapping with the object, relative to a case in which it has not been determined that there is a possibility that the AR image will overlap with the object.

2 Claims, 6 Drawing Sheets

DISPLAY CONTROL DEVICE FOR A VEHICLE

CROSS-REFERENCE TO RELATED APPLICATION

This application is based on and claims priority under 35 USC 119 from Japanese Patent Application No. 2022-190590 filed on Nov. 29, 2022, the disclosure of which is incorporated by reference herein.

BACKGROUND

Technical Field

The present disclosure relates to a display control device for a vehicle.

Related Art

Japanese Patent Application Laid-Open (JP-A) No. 2020-128172 discloses a vehicle including a head-up display capable of forming an AR image (virtual image) in a virtual display region. This AR image has a shape that conforms to a dividing line of a road, and is an image that an occupant recognizes as overlapping with the dividing line. Moreover, in a case in which the AR image is formed so as to overlap with an obstacle positioned on the dividing line, display of a portion of the AR image that overlaps with the object is limited.

In a case in which a camera of the vehicle is unable to accurately detect the shape of the dividing line, the AR image may be formed so as to overlap with an obstacle that is at a position that is separated from the dividing line. Thus, the invention of Japanese Patent Application Laid-Open (JP-A) No. 2020-128172 has room for improvement with regard to making it less likely for the occupant of the vehicle to feel annoyance in such a case.

In consideration of the above facts, an object of the present disclosure is to provide a display control device for a vehicle that is less likely to make an occupant of a vehicle feel annoyance in a case in which an AR image having a shape that conforms to a dividing line of a lane is formed so as to overlap with an object that is at a position that is separated from the dividing line.

SUMMARY

A display control device for a vehicle according to a first aspect of the present disclosure includes: an image forming section configured to form an AR image having a shape that conforms to a dividing line of a lane in which a vehicle travels; an object recognition section configured to recognize an object positioned in the lane; and a processor configured to control the image forming section so as to form the AR image, wherein, in a case in which it has been determined, based on a distance between the vehicle and the object, that there is a possibility that the AR image will overlap with the object, the processor reduces a visibility of a specific portion of the AR image, which is a portion that has a possibility of overlapping with the object, relative to a case in which it has not been determined that there is a possibility that the AR image will overlap with the object.

In the display control device for a vehicle according to the first aspect, in a case in which it has been determined, based on the distance between the vehicle and the object positioned in the lane, that there is a possibility that the AR image having a shape that conforms to the dividing line will overlap with the object, the visibility of the specific portion of the AR image, which is a portion that has a possibility of overlapping with the object, is reduced compared to a case in which it has not been determined that there is a possibility that the AR image will overlap with the object. Consequently, even in a case in which, for example, the AR image is formed such that the specific portion overlaps with an object that is at a position that is separated from the dividing line, it is unlikely that an occupant who visually recognizes the object and the specific portion will feel annoyance.

A display control device for a vehicle according to a second aspect of the present disclosure is the display control device for a vehicle according to the first aspect, wherein the processor is configured to reduce a luminance of the specific portion of the AR image relative to a luminance of portions of the AR image other than the specific portion.

In the display control device for a vehicle according to the second aspect, the luminance of the specific portion of the AR image is reduced compared to the luminance of portions of the AR image other than the specific portion. Consequently, even if the specific portion of the AR image formed by the display control device for a vehicle according to the second aspect overlaps with an object that is at a position that is separated from the dividing line, it is unlikely that an occupant who visually recognizes the object and the specific portion will feel annoyance.

A display control device for a vehicle according to a third aspect of the present disclosure is the display control device for a vehicle according to the first aspect, wherein the processor is configured to determine the specific portion based on a specific distance, which is the distance between the vehicle and the object.

In the display control device for a vehicle according to the third aspect, the specific portion is determined based on the specific distance, which is the distance between the vehicle and the object. Consequently, there is a possibility that the specific portion determined by the display control device for a vehicle according to the third aspect will overlap with the object.

A display control device for a vehicle according to a fourth aspect of the present disclosure is the display control device for a vehicle according to the third aspect, wherein the processor is configured to determine the specific portion such that the specific portion includes a portion positioned further forward than a portion that is positioned the specific distance forward from the vehicle in the AR image.

In the display control device for a vehicle according to the fourth aspect, the specific portion is determined such that the specific portion includes the portion positioned further forward than the portion that is positioned the specific distance forward from the vehicle in the AR image. Consequently, the display control device for a vehicle according to the fourth aspect can include a portion that has a high probability of overlapping with the object in the specific portion with high accuracy.

As described above, the display control device for a vehicle according to the present disclosure has an excellent advantageous effect in that an occupant of the vehicle is unlikely to feel annoyance in a case in which the AR image having a shape that conforms to the dividing line of the lane is formed so as to overlap with an object that is at a position that is separated from the dividing line.

BRIEF DESCRIPTION OF THE DRAWINGS

Exemplary embodiments of the present disclosure will be described in detail based on the following figures, wherein.

DETAILED DESCRIPTION

Figure 1:
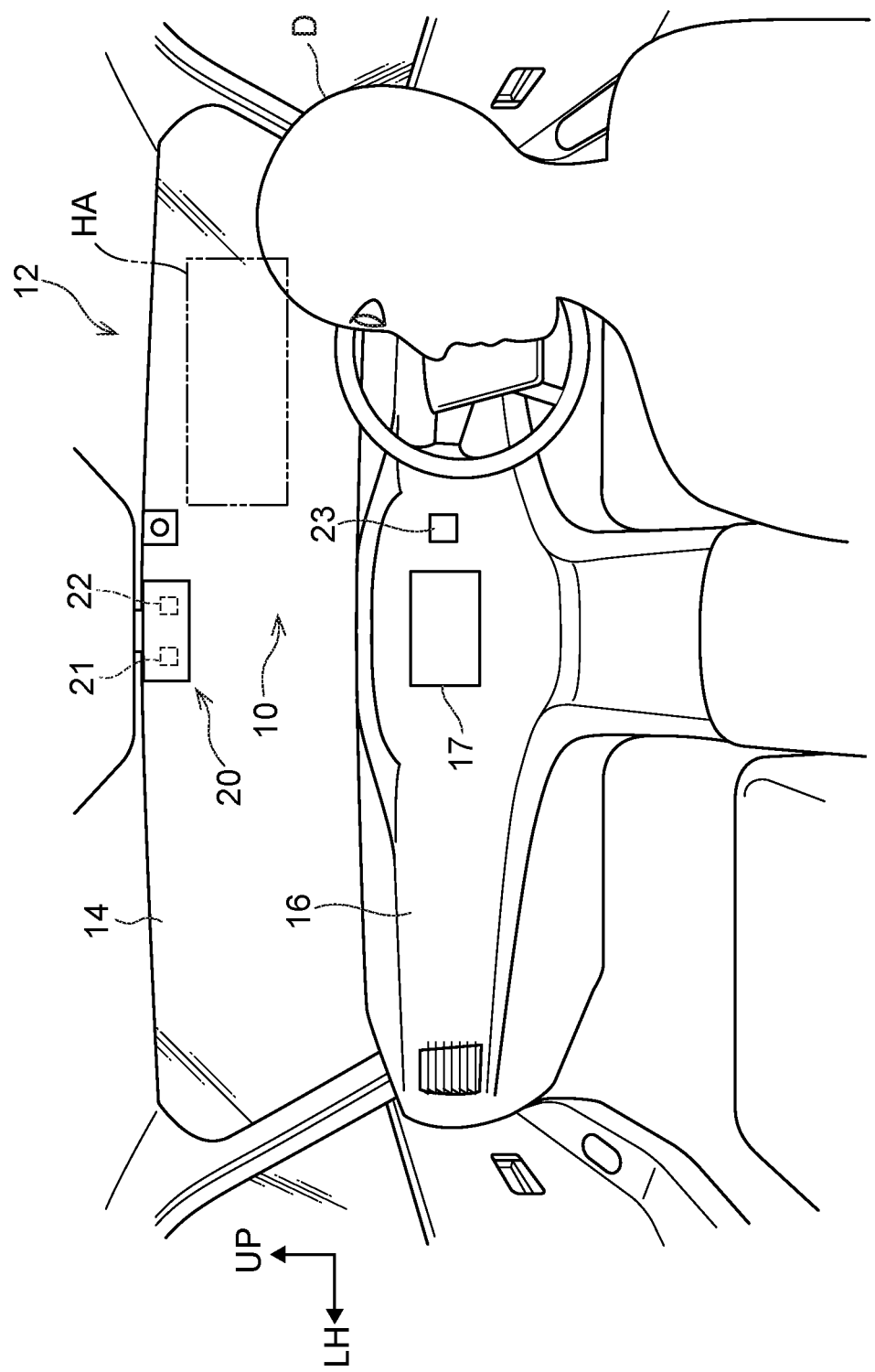
FIG. 1 is a diagram illustrating a vehicle interior of a vehicle including a display control device for a vehicle according to an exemplary embodiment.

An exemplary embodiment of a display control device for a vehicle 10 (hereafter referred to as a "control device 10") according to the present disclosure will be explained below with reference to the drawings. An arrow FR illustrated in the drawings as appropriate indicates a front side in a vehicle front-rear direction, an arrow LH indicates a left side in a vehicle left-right direction, and an arrow UP indicates an upper side in a vehicle up-down direction.

As illustrated in FIG. 1, a vehicle 12 installed with the control device 10 of the present exemplary embodiment includes a front windshield 14 and an instrument panel 16. The instrument panel 16 is provided with a driving assistance operation device 23. A sensor unit (object recognition section) 20 is provided at an upper portion of a vehicle inside surface of the front windshield 14. The sensor unit 20 includes a camera 21 and a millimeter-wave sensor 22. The camera 21 is capable of photographing a subject positioned ahead of the vehicle from the camera 21 itself. The millimeter-wave sensor 22 transmits scanning waves directed forward and receives reflected waves.

The driving assistance operation device 23 is a device for causing the vehicle 12 to execute driving assistance control, which will be described later. When the driving assistance operation device 23 is in an ON state, the vehicle 12 is capable of executing driving assistance control. When the driving assistance operation device 23 is in an OFF state, the vehicle 12 is unable to execute driving assistance control.

Figure 2:
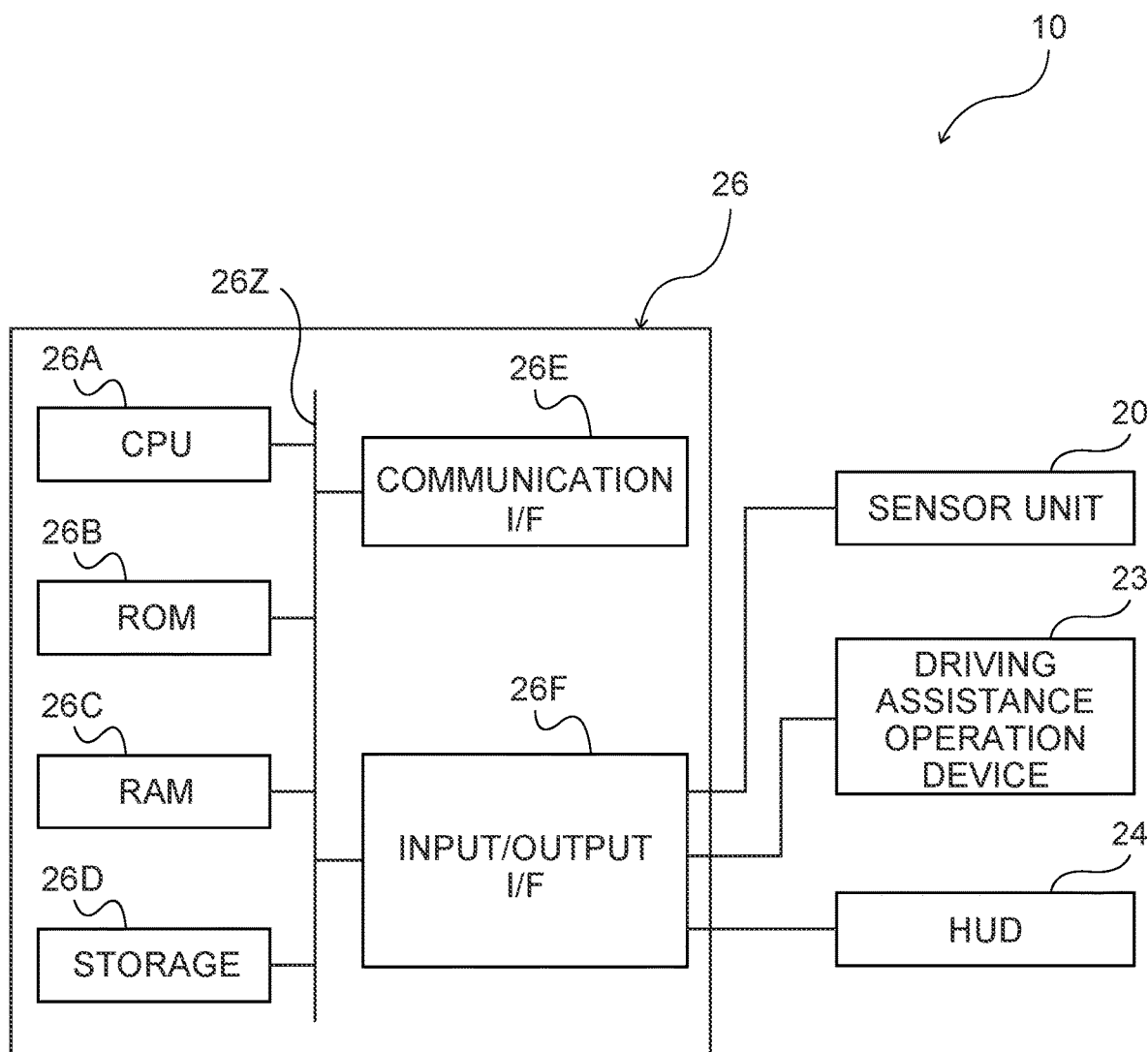
FIG. 2 is a diagram illustrating a hardware configuration of the vehicle illustrated in FIG. 1.

As illustrated in FIG. 2, the vehicle 12 includes an AR-HUD device (head-up display device) (image forming section) 24 (hereinafter referred to as a "HUD") including a projection device.

As illustrated in FIG. 2, the vehicle 12 includes an electronic control unit (ECU) 26 as a hardware configuration.

The ECU 26 is configured to include a central processing unit (CPU) (processor) (computer) 26A, a read only memory (ROM) (non-transitory recording medium) (recording medium) 26B, a random access memory (RAM) 26C, a storage (non-transitory recording medium) (recording medium) 26D, a communication I/F 26E, and an input/output I/F 26F. The CPU 26A, the ROM 26B, the RAM 26C, the storage 26D, the communication I/F 26E, and the input/output I/F 26F are connected so as to be capable of communicating with each other via an internal bus 26Z.

The CPU 26A is a central arithmetic processing unit, and the CPU 26A executes various programs and controls various sections. The CPU 26A reads a program from the ROM 26B or the storage 26D, and executes the program using the RAM 26C as a workspace. The CPU 26A carries out control of the respective configurations and various kinds of arithmetic processing according to programs recorded in the ROM 26B or the storage 26D.

The ROM 26B stores various programs and various data. The RAM 26C serves as a workspace to temporarily store programs and data. The storage 26D is configured by a storage device such as a hard disk drive (HDD), a solid state drive (SSD) or the like, and stores various programs and various data.

The communication I/F 26E is an interface for connecting to a different ECU (not illustrated in the drawings) from the ECU 26 via an external bus (not illustrated in the drawings). For example, a communication standard based on the CAN protocol is used for this interface.

The input/output I/F 26F is an interface for communicating with various devices. These devices include the sensor unit 20, the driving assistance operation device 23, the HUD 24, a sensor group (which will be described later), and an actuator group (which will be described later).

Figure 3:
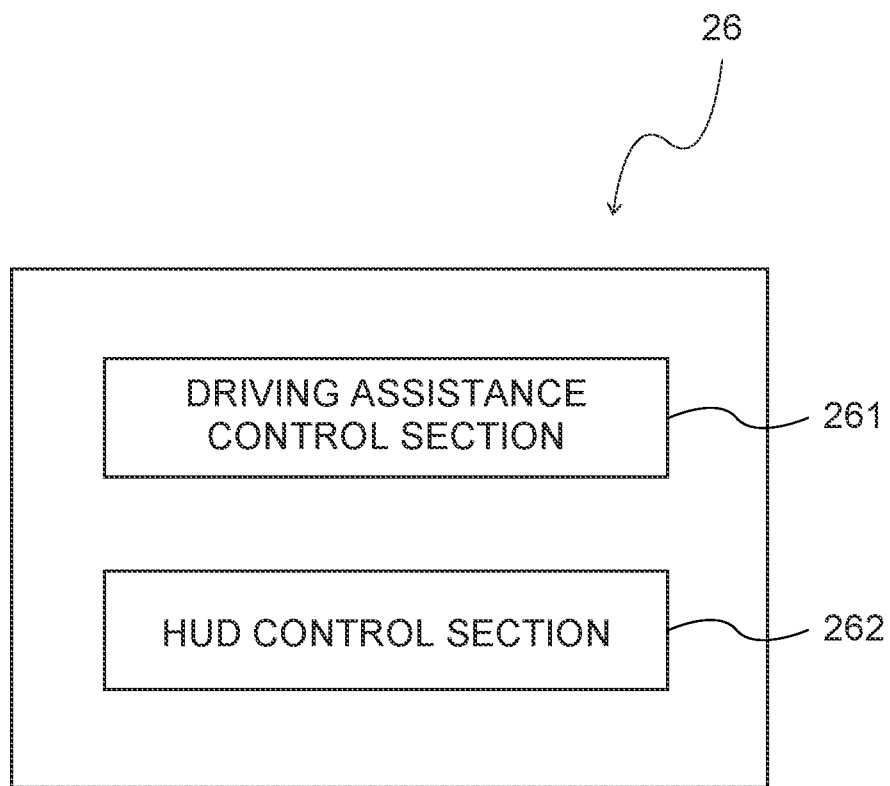
FIG. 3 is a functional block diagram of an ECU illustrated in FIG. 2.

FIG. 3 is a block diagram illustrating an example of a functional configuration of the ECU 26. The ECU 26 includes a driving assistance control section 261 and a HUD control section 262 as functional configuration. The driving assistance control section 261 and the HUD control section 262 are implemented by the CPU 26A reading and executing a program stored in the ROM 26B.

When the driving assistance operation device 23 is in the ON state, the driving assistance control section 261 uses the sensor group and the actuator group (not illustrated in the drawings) provided at the vehicle 12 to cause the vehicle 12 to execute driving assistance control at driving levels 1 to 5 determined by the Society of Automotive Engineers (SAE) (American Society of Automotive Engineers). Moreover, when the driving assistance operation device 23 is in the ON state, a driver (occupant) D (refer to FIG. 1) of the vehicle 12 can select the driving level and the driving assistance control to be executed, by operating the driving assistance operation device 23. The driving assistance control according to the present exemplary embodiment includes, for example, adaptive cruise control (ACC), lane tracing assistance (LTA, lane maintenance assistance control), and lane departure alert control (LDA). The sensor group provided at the vehicle 12 includes a sensor unit 20. The actuator group provided at the vehicle 12 includes an electric actuators of a brake device and an electric steering device, an electric actuator for driving an internal combustion engine, which is a drive source, and an electric motor, which is a drive source.

The HUD control section 262 controls the HUD 24. The ROM 26B or the storage 26D of the ECU 26 stores projection object data including various characters, icons (graphics) and the like. The projection device of the HUD 24 controlled by the HUD control section 262 reads the projection object data from the ROM 26B or the storage 26D to project various types of AR images. These AR images include dividing line display images Imx1 and Imx2, which will be described later. Namely, the HUD 24 is an augmented reality head-up display (AR-HUD). The projected AR images are reflected forward by a reflecting section (not illustrated in the drawings) provided at the vehicle 12. Moreover, the AR images reflected forward by the reflecting section are formed as virtual images in a virtual display region HA (refer to FIG. 1) positioned in front of the front windshield 14.

Moreover, when the vehicle 12 is executing LTA or LDA, the HUD control section 262 recognizes shapes of dividing lines provided at left and right side edges of an immediately preceding region of the road (lane) on which the vehicle 12 is traveling, based on image data acquired by the camera 21.

Figure 4:
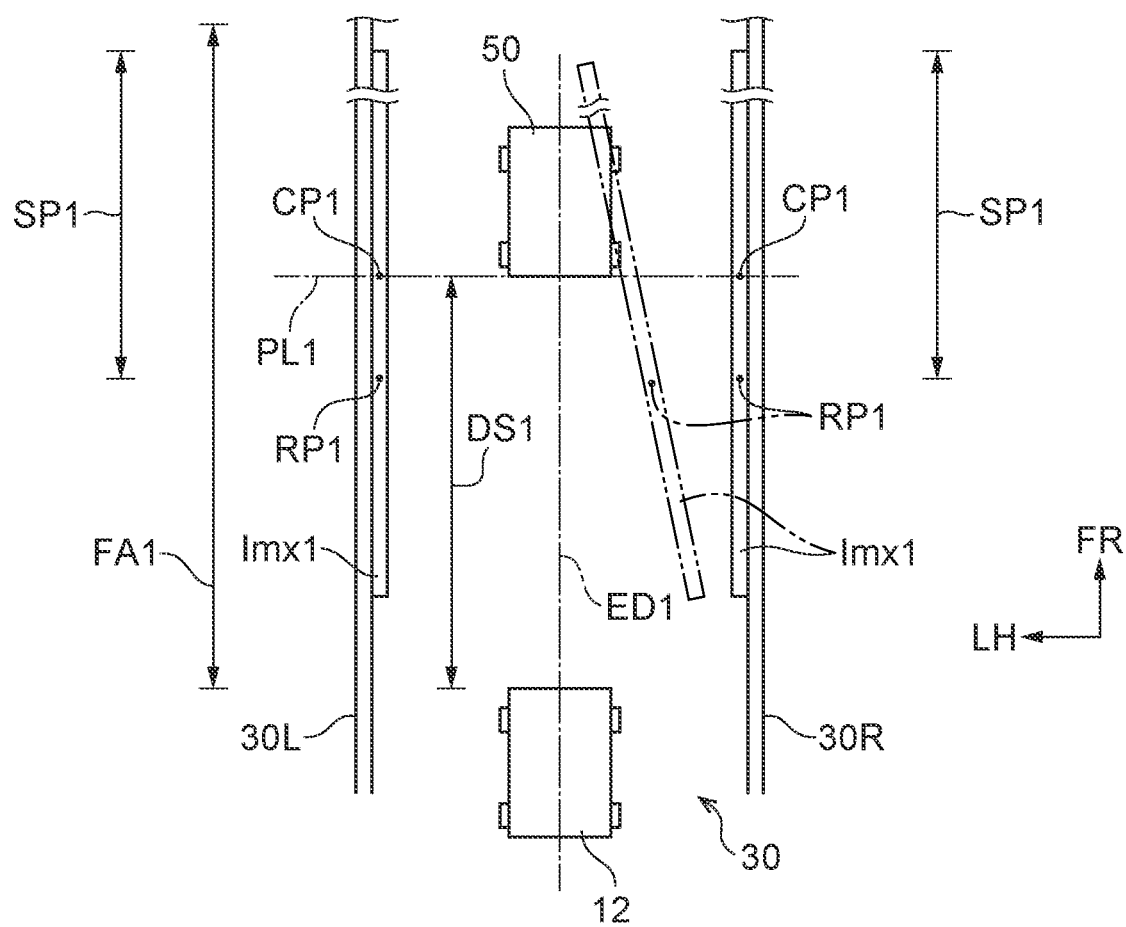
FIG. 4 is a schematic plan view of a straight road, a vehicle, and a preceding vehicle.
Figure 5:
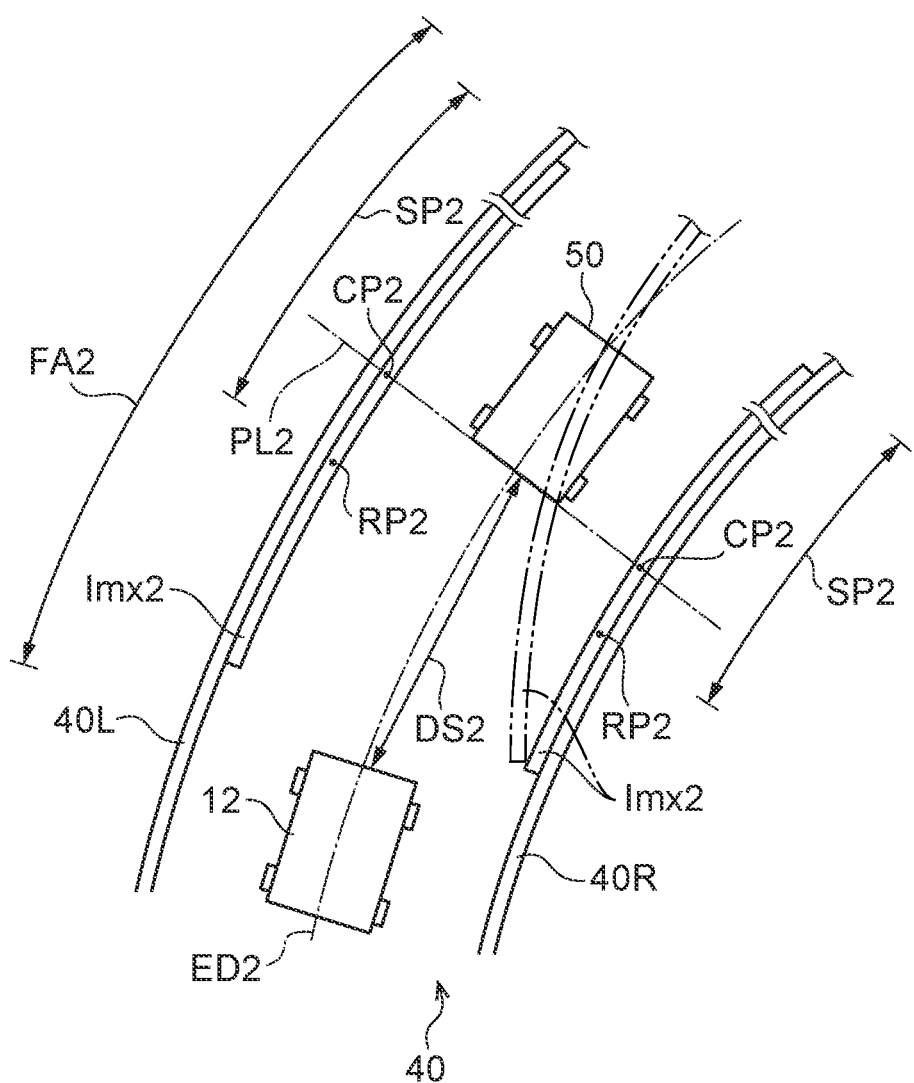
FIG. 5 is a schematic plan view of a circular arc-shaped road, a vehicle, and a preceding vehicle.

The immediately preceding region is a region that is a part of the lane in which the vehicle 12 is traveling and that is positioned immediately ahead of the vehicle 12. A front-rear length of this immediately preceding region can be set arbitrarily, and can be set to, for example, 50 m. Moreover, based on planar shapes of the dividing lines that have been recognized, the HUD control section 262 reads, from among the projection object data, projection object data representing dividing line display images having a shape that conforms to the dividing lines that have been recognized. It should be noted that the "shape that conforms to the dividing lines" includes a shape that is the same as a portion of the dividing lines, and a shape that is similar to a portion of the dividing lines. As illustrated in FIG. 4 and FIG. 5, the type of projected dividing line display images differs depending on a planar shape of the immediately preceding region of the lane in which the vehicle 12 is traveling.

For example, a case in which the vehicle 12 is traveling on a road (lane) 30 illustrated in FIG. 4, and a planar shape of an immediately preceding region FA1 is a substantially linear shape, is presumed. A planar shape of dividing line display images Imx1 in this case is a substantially linear shape. As illustrated in FIG. 4, the HUD control section 262 forms the dividing line display images Imx1 so that a left side dividing line display image Imx1 is adjacent to a right side edge of a left side dividing line 30L that has been recognized (specified) by the HUD control section 262, and a right side dividing line display image Imx1 is adjacent to the a left side edge of a right side dividing line 30R that has been recognized (specified) by the HUD control section 262. Hereinafter, as illustrated by the solid lines in FIG. 4, a formation position of the dividing line display images Imx1 in a case in which the left side dividing line display image Imx1 is adjacent to the right side edge of the actual left side dividing line 30L and the right side dividing line display image Imx1 is adjacent to the left side edge of the actual right side dividing line 30R is referred to as a design position. However, the HUD control section 262 recognizes the dividing lines 30L and 30R based on only the image data acquired by the camera 21. In other words, the HUD control section 262 cannot use detection data from the millimeter-wave sensor 22 when recognizing the dividing lines 30L and 30R. Consequently, the HUD control section 262 may be unable to accurately recognize the positions and shapes of the dividing lines 30L and 30R in the immediately preceding region FA1. In this case, for example, as illustrated by the virtual lines in FIG. 4, there is a possibility that the left and right dividing line display images Imx1 may be formed so that the driver recognizes that the right side dividing line display image Imx1 is separated to the left side from the actual right side dividing line 30R and the left side dividing line display image Imx1 (not illustrated in the drawing) is separated to the left side from the actual left side dividing line 30L. Consequently, there is a possibility that the driver may recognize that a portion of the right side dividing line display image Imx1 is overlapped with a preceding vehicle (object) 50 that is traveling on the road 30 and that is positioned ahead of the vehicle 12.

Accordingly, when it has been determined that the preceding vehicle 50 is traveling in the immediately preceding region based on detection data from the sensor unit 20, the HUD control section 262 carries out luminance adjustment processing, which is an example of visibility reduction processing, on the dividing line display images Imx1 as required.

Namely, based on the detection data from the sensor unit 20, the HUD control section 262 calculates an inter-vehicle distance (specific distance) (distance) DS1 between the vehicle 12 and the preceding vehicle 50. Moreover, the HUD control section 262 determines whether or not an orthogonal line PL1 that is orthogonal to an extension direction ED1 of the road 30 and that passes through a rear end of the preceding vehicle 50, and the left and right dividing line display images Imx1 in the case of being formed at the design position, intersect with each other. In other words, the HUD control section 262 determines whether or not there is a possibility that a portion of the dividing line display images Imx1 will overlap with the preceding vehicle 50 traveling on the road 30. Hereinafter, a determination that the orthogonal line PL1 (PL2) and the dividing line display images Imx1 (Imx2) intersect with each other is referred to as an "intersection determination". In a case in which the intersection determination has been made, the HUD control section 262 calculates a position of an intersection CP1 between the orthogonal line PL1 and the dividing line display images Imx1. The intersection CP1 is a portion positioned substantially at the inter-vehicle distance DS1 ahead of the vehicle 12. Moreover, the HUD control section 262 calculates a position RP1 on the dividing line display images Imx1 that is separated toward the rear from the intersection CP1 by a predetermined distance. This predetermined distance can be set arbitrarily and is, for example, 2 m. Moreover, the HUD control section 262 reduces a luminance of a specific portion SP1, which is a portion positioned ahead of the position RP1 of the left and right dividing line display images Imx1, relative to a case in which no intersection determination has been made. Accordingly, the luminance of the specific portion SP1 becomes lower than a luminance of portions of the dividing line display images Imx1 other than the specific portion SP1.

In a case in which the luminance of the specific portion SP1 of the left and right dividing line display images Imx1 is reduced in this manner, as illustrated by the virtual lines in FIG. 4, there are cases in which the right side dividing line display image Imx1 is formed such that the driver recognizes that the specific portion SP1 is overlapped with the preceding vehicle 50. However, compared to a case in which the luminance adjustment processing is not carried out, the driver who has visually recognized the specific portion SP1 and the preceding vehicle 50 is less likely to feel annoyance.

Further, a case in which the vehicle 12 is traveling on a road (lane) 40 illustrated in FIG. 5, and a planar shape of an immediately preceding region FA2 is substantially a circular arc shape, is presumed. The planar shape of the dividing line display images Imx2 in this case is substantially a circular arc shape. In this case, based on the detection data from the sensor unit 20, the HUD control section 262 calculates an inter-vehicle distance (specific distance) (distance) DS2 between the vehicle 12 and the preceding vehicle 50. Moreover, the HUD control section 262 determines whether or not an orthogonal line PL2 that is orthogonal to an extension direction ED2 of the immediately preceding region FA2 of the road 40 and that passes through the rear end of the preceding vehicle 50, and the left and right dividing line display images Imx2 in the case of being formed at the design position, intersect with each other. In other words, the HUD control section 262 determines whether or not there is a possibility that a portion of the dividing line display images Imx2 will overlap with the preceding vehicle 50 traveling on the road 40. In a case in which an intersection determination has been made, the HUD control section 262 calculates a position of an intersection CP2 between the orthogonal line PL2 and the dividing line display images Imx2. The intersection CP2 is a portion positioned substantially the inter-vehicle distance DS2 ahead of the vehicle 12. Moreover, the HUD control section 262 calculates a position RP2 on the dividing line display images Imx2 that is separated toward the rear from the intersection CP2 by the aforementioned predetermined distance. Moreover, the HUD control section 262 reduces a luminance of a specific portion SP2, which is a portion positioned ahead of the position RP2 of the left and right dividing line display images Imx2, compared to a case in which no intersection determination has been made. Accordingly, the luminance of the specific portion SP2 becomes lower than a luminance of portions of the dividing line display images Imx2 other than the specific portion SP2.

In a case in which the luminance of the specific portion SP2 of the left and right dividing line display images Imx2 is reduced in this manner, as illustrated by the virtual lines in FIG. 5, there are cases in which the right side dividing line display image Imx2 is formed such that the driver recognizes that the specific portion SP2 is overlapped with the preceding vehicle 50. However, compared to a case in which the luminance adjustment processing is not carried out, the driver who has visually recognized the specific portion SP2 and the preceding vehicle 50 is less likely to feel annoyance.

Among the configurations described above, the sensor unit 20, the driving assistance operation device 23, the HUD 24, the ECU 26, the sensor group, and the actuator group are constituent elements of the control device 10.

Next, processing executed by the CPU 26A of the ECU 26 will be explained. The CPU 26A repeatedly executes the processing of the flowchart illustrated in FIG. 6 each time a predetermined amount of time has elapsed.

At step S10 (hereinafter, the word "step" will be omitted), the CPU 26A determines whether or not the vehicle 12 is executing LTA or LDA.

In a case in which the determination is YES at S10, the CPU 26A proceeds to S11 and causes the HUD 24 to form the dividing line display images. For example, in a case in which the vehicle 12 is traveling on the road 30, the CPU 26A causes the HUD 24 to form the dividing line display images Imx1.

Next, the CPU 26A proceeds to S12 and determines whether or not a preceding vehicle is present in the immediately preceding region. For example, in a case in which the preceding vehicle 50 is traveling in the immediately preceding region FA1 in FIG. 4, the CPU 26A makes a determination of Yes at S12.

In a case in which the determination is YES at S12, the CPU 26A proceeds to S13 and determines whether or not there is a possibility that the dividing line display images Imx1 or Imx2 will overlap with the preceding vehicle 50. In other words, the CPU 26A determines whether or not the dividing line display images Imx1 or Imx2, and the orthogonal line PL1 or PL2, intersect with each other.

In a case in which the determination is YES at S13, the CPU 26A proceeds to S14 and determines the specific portion SP1 or SP2 of the dividing line display images Imx1 or Imx2.

In a case in which the processing of S14 has been completed, the CPU 26A proceeds to S15 and carries out luminance adjustment processing for the determined specific portion SP1 or SP2.

Figure 6:
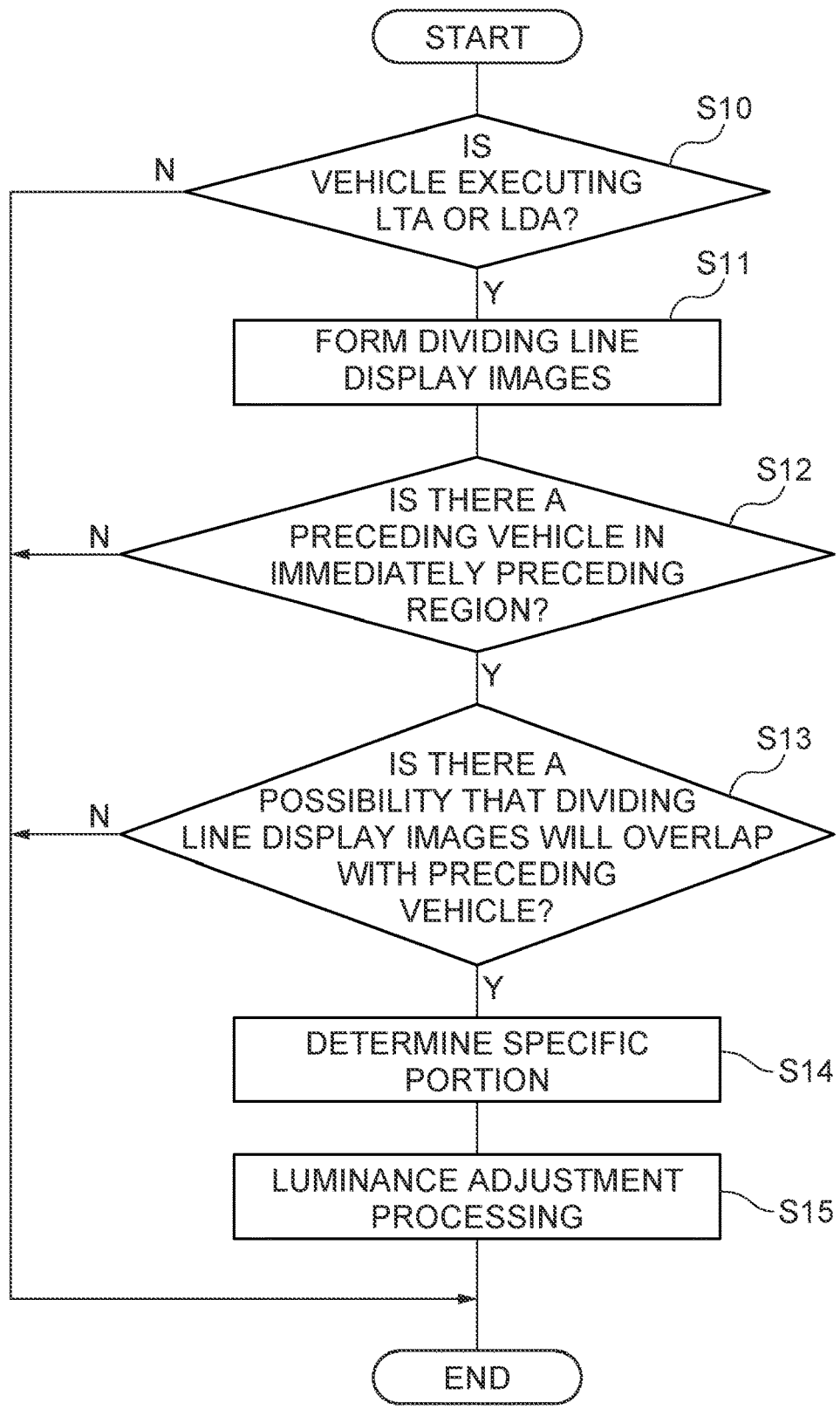
FIG. 6 is a flowchart illustrating processing executed by a CPU of the ECU.

When a determination of No has been made at S10, 12, or 13, or when the processing of S15 has been completed, the CPU 26A temporarily ends the processing of the flowchart of FIG. 6.

As described above, the control device 10 of the present exemplary embodiment determines whether or not there is a possibility that the dividing line display images Imx1 or Imx2 having shapes that conform to the dividing lines 30L and 30R, or 40L and 40R, will overlap with the preceding vehicle 50, based on the inter-vehicle distance DS1 or DS2 between the preceding vehicle 50 traveling in the immediately preceding region FA1 or FA2 of the road 30 or 40, and the vehicle 12. Moreover, in a case in which an intersection determination has been made, the control device 10 reduces the luminance of the specific portion SP1 or SP2, which is the portion at which the dividing line display images Imx1 or Imx2 have a possibility of overlapping with the preceding vehicle 50, relative to a case in which no intersection determination has been made. In other words, the control device 10 reduces the visibility of the specific portion SP1 or SP2. Consequently, even in a case in which the driver D recognizes that the specific portion SP1 or SP2 is overlapped with the preceding vehicle 50, the driver D is less likely to feel annoyance.

Moreover, the control device 10 determines the specific portion SP1 or SP2 based on the inter-vehicle distance DS1 or DS2, which is the distance between the vehicle 12 and the preceding vehicle 50. More specifically, the control device 10 determines the range of the specific portion SP1 or SP2 such that the specific portion SP1 or SP2 includes a portion positioned ahead of the intersection CP1 or CP2, which is a portion of the dividing line display images Imx1 or Imx2 that is substantially separated from the vehicle 12 toward the front by the inter-vehicle distance DS1 or DS2. Consequently, there is a high probability that the specific portion SP1 or SP2 determined by the control device 10 will overlap with the preceding vehicle 50 in a case in which the dividing line display images Imx1 or Imx2 are formed so as to be separated from the dividing lines 30L and 30R, or 40L and 40R. Namely, the control device 10 is capable of including a portion that has a high probability of overlapping with the preceding vehicle 50 in a case in which the dividing line display images Imx1 or Imx2 are formed so as to be separated from the dividing lines 30L and 30R, or 40L and 40R, in the specific portion SP1 or SP2 with high accuracy.

Moreover, the specific portion SP1 or SP2 determined by the control device 10 also includes a portion that is a part of the dividing line display images Imx1 or Imx2 and that is positioned rearward of the intersection CP1 or CP2. In a case in which recognition accuracy of the dividing lines 30L and 30R by the HUD control section 262 is low, there is a possibility that the portion of the dividing line display images Imx1 or Imx2 that is positioned rearward of the intersection CP1 or CP2 will overlap with the preceding vehicle 50. Consequently, compared with a case in which the specific portion SP1 or SP2 does not include the portion positioned rearward of the intersection CP1 or CP2, the dividing line display images Imx1 and Imx2 of the present exemplary embodiment are less likely to make the driver D feel annoyance in a case in which they overlap with the preceding vehicle 50.

Although explanation has been given above regarding the control device 10 according to the exemplary embodiment, the design of the control device 10 may be modified as appropriate within a range that does not depart from the spirit of the present disclosure.

For example, the visibility reduction processing that reduces the visibility of the specific portions SP1 and SP2 may be different processing from the luminance adjustment processing. For example, the visibility reduction processing may be processing that makes line widths of the specific portions SP1 and SP2 narrower than in a case in which no intersection determination has been made. Alternatively, the visibility reduction processing may be processing in which the specific portions SP1 and SP2 are represented by dotted lines.

In a case in which an intersection determination has been made, the visibility of the entire dividing line display images Imx1 or Imx2 may be reduced compared with a case in which no intersection determination has been made. For example, the luminance of the entire dividing line display images Imx1 or Imx2 may be reduced.

For example, a configuration may be provided in which images (not illustrated in the drawings) representing a road (lane) on which the vehicle 12 is traveling and right and left dividing lines are displayed on a display 17 (refer to FIG. 1) provided at the instrument panel 16. In this case, dividing line display images (not illustrated in the drawings) corresponding to the left and right dividing lines are displayed on the display 17. In a case in which an intersection determination has been made in this modified example, visibility reduction processing may be performed on a specific portion of the dividing line display images or on the entire dividing line display images.

Moreover, the visibility reduction processing may be performed on the specific portion of the dividing line display images when it has been determined that there is a possibility that a portion of the dividing line display images will overlap with a different object from the preceding vehicle 50 that is positioned in the lane in which the vehicle 12 is traveling. Such objects include, for example, pedestrians and motorcycles.

Further, a configuration may be provided in which the portion positioned rearward of the intersection CP1 or CP2 is not included in the specific portion SP1 or SP2.

What is claimed is:

1. A display control device for a vehicle, comprising:
an image forming section configured to form an AR image having a shape that conforms to a dividing line of a lane in which a vehicle travels;
an object recognition section configured to recognize an object positioned in the lane;
a processor configured to control the image forming section so as to form the AR image,
determine, based on a distance between the vehicle and the object, whether there is a possibility that the AR image will overlap with the object; and
in response to a determination that there is a possibility that the AR image will overlap with the object:
  determine a specific portion of the AR image that has a possibility of overlapping with the object by:
    determining whether an orthogonal line that is orthogonal to an extension direction ED1 of the lane and that passes through a rear end of the object, and the AR image, intersect with each other;
    in response to a determination that the orthogonal line intersects the AR image:
      calculating a position of an intersection between the orthogonal line and the AR image;
      determine a position that is a predetermined distance away from the intersection; and
      determine the specific portion of the AR image to be a portion ahead of the determined position in a travel direction; and
  reduce a visibility of the determined specific portion of the AR image.

2. The display control device for a vehicle according to claim 1, wherein the processor is configured to reduce a luminance of the specific portion of the AR image relative to a luminance of portions of the AR image other than the specific portion.

* * * * *